(12) United States Patent
Kawai

(10) Patent No.: US 8,462,267 B2
(45) Date of Patent: Jun. 11, 2013

(54) FRAME RATE CONVERSION APPARATUS AND FRAME RATE CONVERSION METHOD

(75) Inventor: Ai Kawai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 12/728,558

(22) Filed: Mar. 22, 2010

(65) Prior Publication Data

US 2010/0259675 A1    Oct. 14, 2010

(30) Foreign Application Priority Data

Apr. 9, 2009   (JP) ................................. 2009-095163

(51) Int. Cl.
*H04N 7/01*    (2006.01)
*H04N 11/20*    (2006.01)

(52) U.S. Cl.
USPC .......................................... 348/459; 348/452

(58) Field of Classification Search
USPC .......... 348/441–459, 618–624; 345/690–693, 345/63
See application file for complete search history.

(56) References Cited

U.S. PATENT DOCUMENTS 7,154,516 B2 *  12/2006  Kawahara et al. ............ 345/690
2005/0237277 A1 *  10/2005  Kawahara ....................... 345/63

FOREIGN PATENT DOCUMENTS

| JP | 09-325715 | 12/1997 |
| JP | 2002-351382 | 12/2002 |
| JP | 2005-309127 A | 11/2005 |

* cited by examiner

*Primary Examiner* — Michael Lee
(74) *Attorney, Agent, or Firm* — Fitzpatrick, Cella, Harper & Scinto

(57) ABSTRACT

At the time of dividing an input frame into multiple subframes and performing frame rate conversion, a frame rate conversion apparatus detects the degree of motion of each region composed of one or more pixels in the input frame, and determines a spatial frequency for each region in the multiple subframes according to the detected degree of motion of the region. The conversion apparatus then converts each region in the multiple subframes to the determined spatial frequency, divides the input frame into those subframes whose regions have been converted, and outputs the subframes.

9 Claims, 17 Drawing Sheets

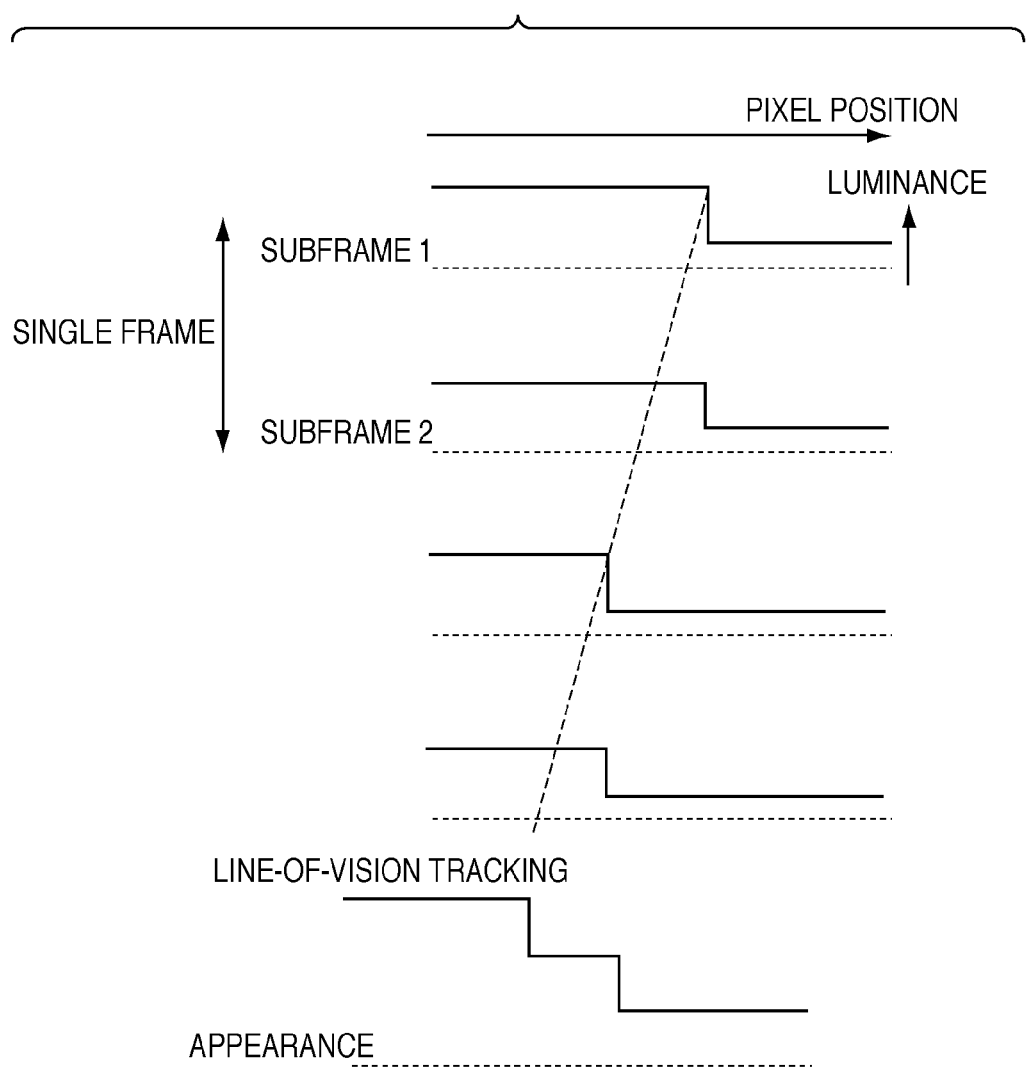

FRAME RATE CONVERSION APPARATUS AND FRAME RATE CONVERSION METHOD

BACKGROUND OF THE INVENTION

1. Field of the Invention

The present invention relates to a frame rate conversion apparatus and a frame rate conversion method for performing frame rate conversion of an input image.

2. Description of the Related Art

Display devices are roughly divided into two categories, impulse type and hold type, in terms of their display characteristics. Impulse-type display devices as referred to herein are display devices that have a short light emission time in a single frame, as illustrated in FIG. 1A. On the other hand, hold-type display devices are display devices such as liquid crystal panels that hold display in a single frame almost constant, as illustrated in FIG. 1B.

Examples of the impulse-type display devices include CRT (cathode ray tube) displays and field emission type displays. The impulse types have the characteristic of tending to cause flicker such as a screen that appears to be flashing because of repeated flashing of pixels. Since flicker is more easily detected with higher luminance or in a larger screen area, the problem of flicker with the impulse-type display devices further needs to be improved with the recent increase in display screen size.

One example of the hold-type display devices is an LCD (light crystal display). Because of a long pixel illumination time, the hold types have a problem in that a moving image causes motion blurring due to the characteristics of the hold types. In other words, the problem that needs to be improved is reduced visual resolution of moving images.

As a method for improving such motion blurring, a method has been suggested for adding an optical shutter mechanism to a liquid crystal panel so as to restrict a display light duration time and thereby bring display characteristics nearer to those of an impulse-type display device (see Japanese Patent Laid-open No. 9-325715, for example).

The above method (Japanese Patent Laid-open No. 9-325715), however, has a problem in that flicker occurs because display characteristics are closer to those of the impulse types where pixels repeat flashing.

One example of a method for reducing such flicker is a method for increasing the frame rate of display by dividing an input frame into multiple subframes by an arbitrary factor. For example, an input image illustrated in FIG. 2A is divided into two subframes as illustrated in FIG. 2B so as to double the frame rate of display, which increases the time frequency in display and, as a result, renders flicker less likely to be detected.

However, at the time of viewing such a display, a subframe that is behind in time deviates from the line-of-sight tracking during a single frame time as illustrated in FIG. 3, so pseudo contours that are dependent on visual characteristics arise.

In order to reduce such pseudo contours, a technique for increasing or decreasing spatial frequency components in a divided subframe at the time of frame rate conversion is known (see Japanese Patent Laid-Open No. 2002-351382, for example). With this technique, high frequency components in a subframe that is behind in time are attenuated and perceived pseudo contours are improved accordingly.

With the above-described technique (Japanese Patent Laid-Open No. 2002-351382), however, there is the problem of floating black levels whereby edge contrast in the vicinity of edges decreases, and the problem of the tailing of moving edges being noticeable. In the above-described technique (Japanese Patent Laid-Open No. 2002-351382), while an image is separated by the spatial frequency, the separation frequency is determined by the filter factor of a low-pass filter or a high-pass filter.

FIGS. 4A and 4B are diagrams illustrating the relationship between the filter factor of a low-pass filter and the output thereof. FIG. 4A represents spatial weights for the case where the filter factor of a low-pass filter is high, and FIG. 4B represents spatial weights for the case where the filter factor is low. It can be seen that pixel values that are farther away from the processed pixel position are weighed more in the case of a higher filter factor.

FIGS. 5A to 5C are diagrams illustrating outputs with respect to an input, for the case where the filter factor of a low-pass filter is high and the case where the filter factor is low. FIG. 5A represents the input. It can be seen that the high filter factor illustrated in FIG. 5B results in a lower spatial frequency than the low filter factor illustrated in FIG. 5C.

FIGS. 6A and 6B are diagrams illustrating the relationship between outlines of display outputs in the case of applying the above-described technique (Japanese Patent Laid-Open No. 2002-351382) and the appearance of the display outputs as captured visually. Referring to FIG. 6A, it is found that in a high edge-contrast region, the luminance in a black-filled region in the drawing increases and the region appears as floating black levels. A problem is that such a floating-black-level region, for example, an image-degraded region, increases in area as the filter factor increases.

Referring to FIG. 6B, on the other hand, it is found that edge breakups occur in edge portions of a motion region. Such breakups expand as the filter factor decreases.

SUMMARY OF THE INVENTION

The present invention provides an apparatus and a method that maintains the effect of reducing flicker, motion blurring, pseudo contours and image breakups.

According to one aspect of the present invention, there is provided a frame rate conversion apparatus that divides an input frame into a plurality of subframes and performs frame rate conversion, comprising: a detection unit that detects a degree of motion of the input frame; a generation unit that generates a filter factor for use in filtering, according to the degree of motion detected by the detection unit; a filtering unit that filters the input frame based on the filter factor generated by the generation unit; and an output unit that divides the frame obtained as a result of the filtering by the filtering unit into a plurality of subframes and outputs the subframes.

According to another aspect of the present invention, there is provided a frame rate conversion apparatus that divides an input frame into a plurality of subframes and performs frame rate conversion, comprising: a detection unit that detects a degree of motion of the input frame; a filtering unit that respectively filters the input frame based on predetermined different filter factors; a computation unit that computes a composition ratio for a plurality of frames that have been respectively filtered by the filtering unit using the different filter factors, according to the degree of motion detected by the detection unit; a composition unit that composes the plurality of frames that have been respectively filtered by the filtering unit, based on the composition ratio computed by the computation unit; and an output unit that divides the frame obtained as a result of the composition by the composition unit into a plurality of subframes and outputs the subframes.

According to still another aspect of the present invention, there is provided a frame rate conversion method performed by a frame rate conversion apparatus that divides an input frame into a plurality of subframes and performs frame rate conversion, the method comprising: detecting a degree of motion of the input frame; generating a filter factor according to the degree of motion detected in the detecting step; filtering the input frame based on the filter factor generated in the generating step; and dividing the frame obtained as a result of the filtering in the filtering step into a plurality of subframes and outputting the subframes.

According to yet another aspect of the present invention, there is provided a frame rate conversion method performed by a frame rate conversion apparatus that divides an input frame into a plurality of subframes and performs frame rate conversion, the method comprising: detecting a degree of motion of the input frame; respectively filtering the input frame based on predetermined different filter factors; computing a composition ratio for a plurality of frames that have been respectively filtered in the filtering step, according to the degree of motion detected in the detecting step; composing the plurality of frames that have been respectively filtered in the filtering step, based on the composition ratio computed in the computing step; and dividing the frame obtained as a result of the composition in the composing step into a plurality of subframes and outputting the subframes.

Further features of the present invention will become apparent from the following description of exemplary embodiments (with reference to the attached drawings).

BRIEF DESCRIPTION OF THE DRAWINGS

FIG. 3 is a diagram illustrating an example where pseudo contours are generated due to visual characteristics.

DESCRIPTION OF THE EMBODIMENTS

Hereinafter, preferred embodiments of the present invention will be described in detail with reference to the drawings.

First Embodiment

Figure 7:
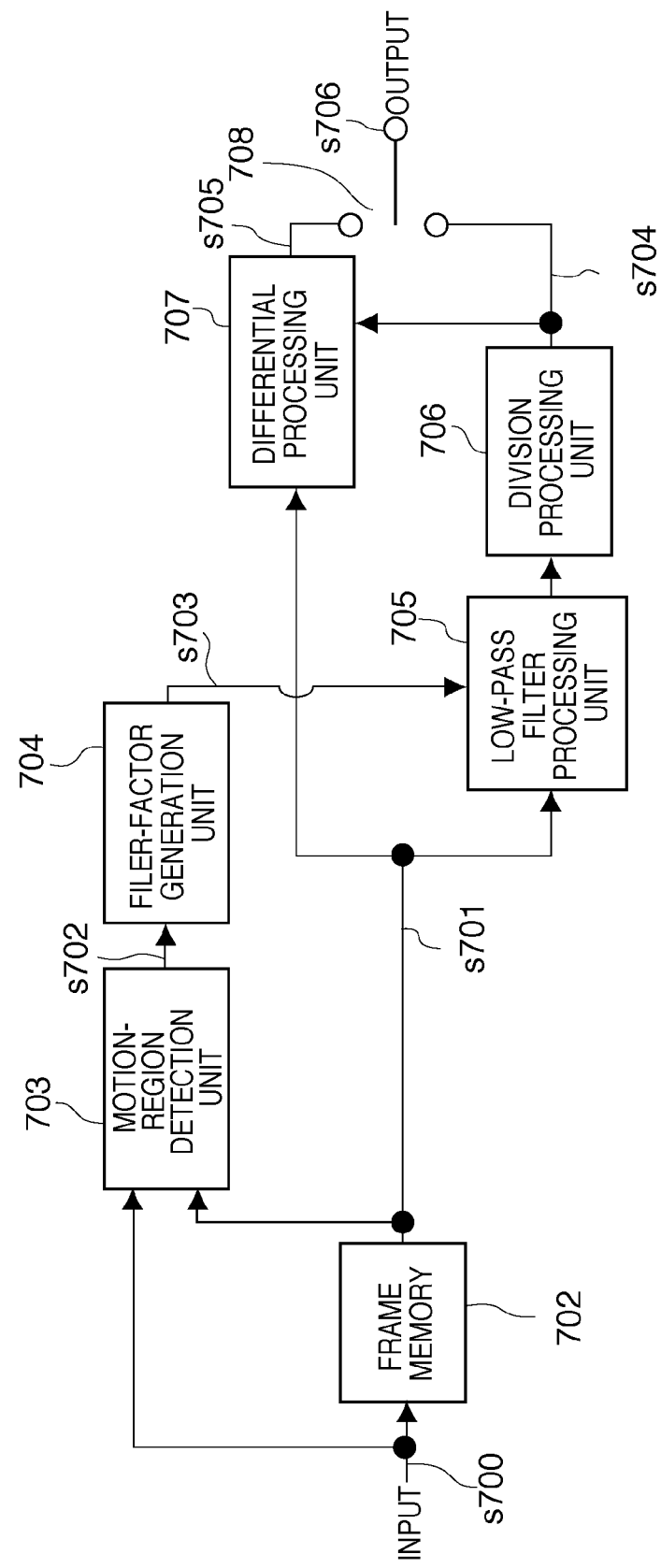
FIG. 7 is a schematic block diagram illustrating an example of the configuration of a frame rate conversion apparatus according to a first embodiment.

FIG. 7 is a schematic block diagram illustrating an example of the configuration of a frame rate conversion apparatus according to a first embodiment. The frame rate conversion apparatus divides an input image (hereinafter referred to as an "input frame") into multiple subframes so as to multiply the output frame rate. The input frame is divided by detecting motion of each region in the input frame from an interframe difference and then reflecting the detected result on spatial frequency components for each region in a subframe.

Note that the present embodiment will be described using, for example, an example where the input frame rate is doubled by frame rate conversion.

The frame rate conversion apparatus performs frame rate conversion on an input frame so as to reduce flicker and motion blurring, and further to reduce breakups of frame-rate-converted video display. Here, the frequency of occurrence of flicker relates to contrast between divided subframes. Similarly, the frequency of occurrence of motion blurring relates to the contrast.

Specifically, the occurrence of flicker depends on the contrast between subframes s704 and s705 illustrated in FIG. 7. That is, flicker is more likely to occur as the difference in luminance between those subframes increases, whereas flicker is less likely to occur as the difference in luminance decreases.

Note that the subframe s704 is output behind in time during a single frame time, and the subframe s705 is output ahead in time during the single frame time.

The frame rate conversion apparatus controls the spatial frequency for each region of the subframes s704 and s705. The control is performed based on the relationship between motion of each region detected between frames and image degradation.

The frame rate conversion apparatus includes, as functional components, a frame memory 702, a motion-region detection unit 703, a filter-factor generation unit 704, a low-pass filter processing unit 705, a division processing unit 706, a differential processing unit 707, and a switching unit 708.

The frame memory 702 sequentially holds one or more input frames. The motion-region detection unit 703 compares a frame s701 stored in the frame memory 702 with an input frame s700, calculates the degree of motion M for each region in the frame s701, and outputs the resultant motion map Mmap as s702.

Figure 8:
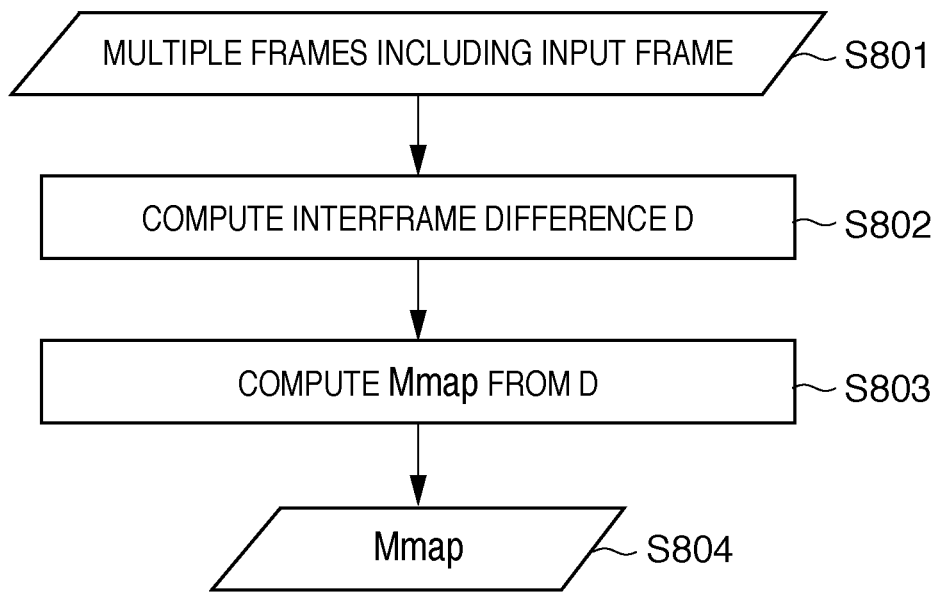
FIG. 8 is a flow chart showing an example of processing performed by a motion-region detection unit 703.

FIG. 8 is a flow chart showing an example of processing performed by the motion-region detection unit 703. First, the motion-region detection unit 703 inputs multiple frames including an input frame (S801). Then, a difference between the input frame and a frame that has been input before (e.g., immediately before) the input frame is computed for each pixel (S802). Then, the degree of motion M is computed from the difference value (S803). The resultant degrees of motion M for the regions are then output as map-like (two-dimensional) data Mmap (S804).

Note that, while the present embodiment describes the case where each region represents a single pixel, each region may be a predetermined range of multiple pixels (N×N pixels). In the case where each region represents multiple pixels, an average value for the multiple pixels may, for example, be processed as a value for the region in order to process each region in the same manner as in the case where each region represents a single pixel.

Figure 9:
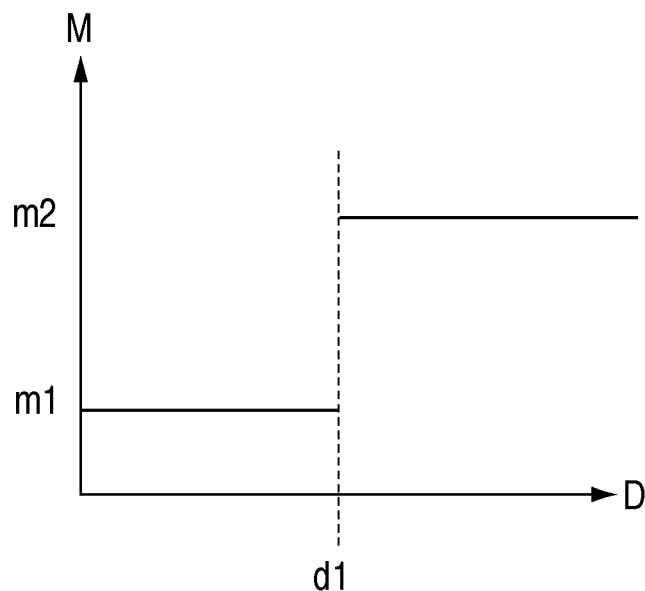
FIG. 9 is a diagram illustrating an example of the relationship between an interframe difference value D and the degree of motion M.

FIG. 9 is a diagram illustrating an example of the relationship between the interframe difference value D and the degree of motion M. As illustrated in FIG. 9, the degree of motion M detected tends to increase as the interframe difference value D increases. While the present embodiment describes the case where the degree of motion M represents the degree of motion, it may of course be the inverse, for example, the degree of stillness.

The motion-region detection unit 703 performs thresholding that imposes a relatively low processing load in order to compute the degree of motion of each region in the frame s701 that has been output from the frame memory 702. Specifically, if the interframe difference value is lower than a (predetermined) threshold value d1, the degree of motion m1 is output, whereas if the interframe difference value is not lower than the threshold value d1, the degree of motion m2 is output. This thresholding is performed on each interframe difference value computed for each region, and the resultant map-like data Mmap is output as the degrees of motion. Here, assume that the degree of motion m2 is higher than the degree of motion m1.

Then, the filter-factor generation unit 704 performs filtering on the input motion degree map Mmap and outputs the resultant s703 as a filter factor map Fmap to the low-pass filter processing unit 705.

Figure 10:
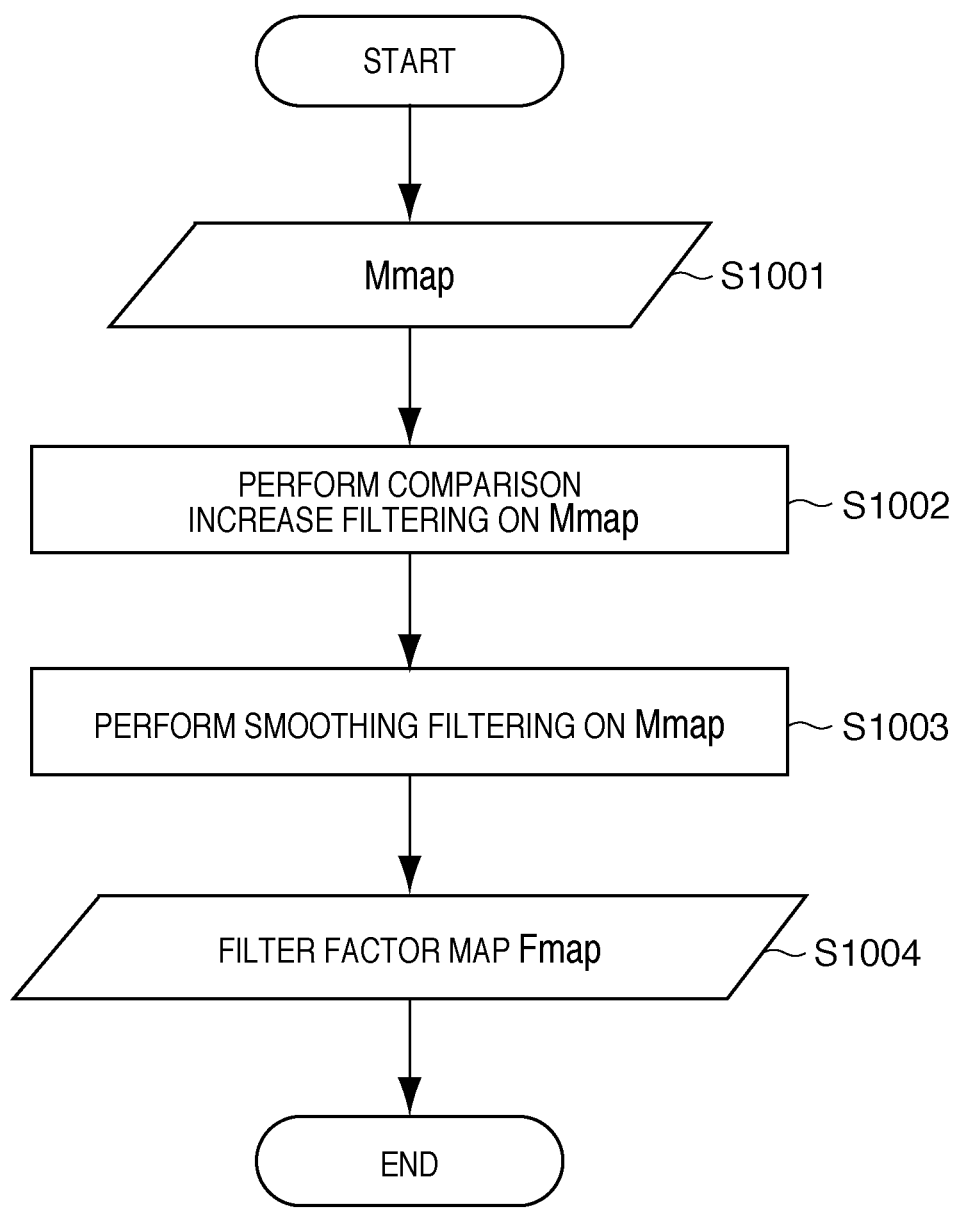
FIG. 10 is a flow chart showing an example of processing performed by a filter-factor generation unit 704.

FIG. 10 is a flow chart showing an example of processing performed by the filter-factor generation unit 704. First, the filter-factor generation unit 704 inputs the motion degree map Mmap (S1001). On the motion degree map Mmap (illustrated by 11a in FIG. 11), the degree of motion m1 is given to a region that is determined as a still region (a region that has a degree of motion M lower than d1). And, the degree of motion m2 is given to a region that is determined as a motion region (a region that has a degree of motion M higher than d1). The horizontal axis indicates the pixel position.

The filter-factor generation unit 704 then performs comparison increase filtering on the motion degree map Mmap (S1002). In the present example, the value for the degree of motion M for a region of interest is compared with the value for the degree of motion M for a surrounding region (a predetermined range of regions) so as to increase the value of the degree of motion M for the region of interest. This is, for example, a process of replacing a certain value with a maximum value in the range of filtering. As a result, some values for the degrees of motion M on the motion degree map Mmap are increased as illustrated by 11b in FIG. 11.

Figure 11:
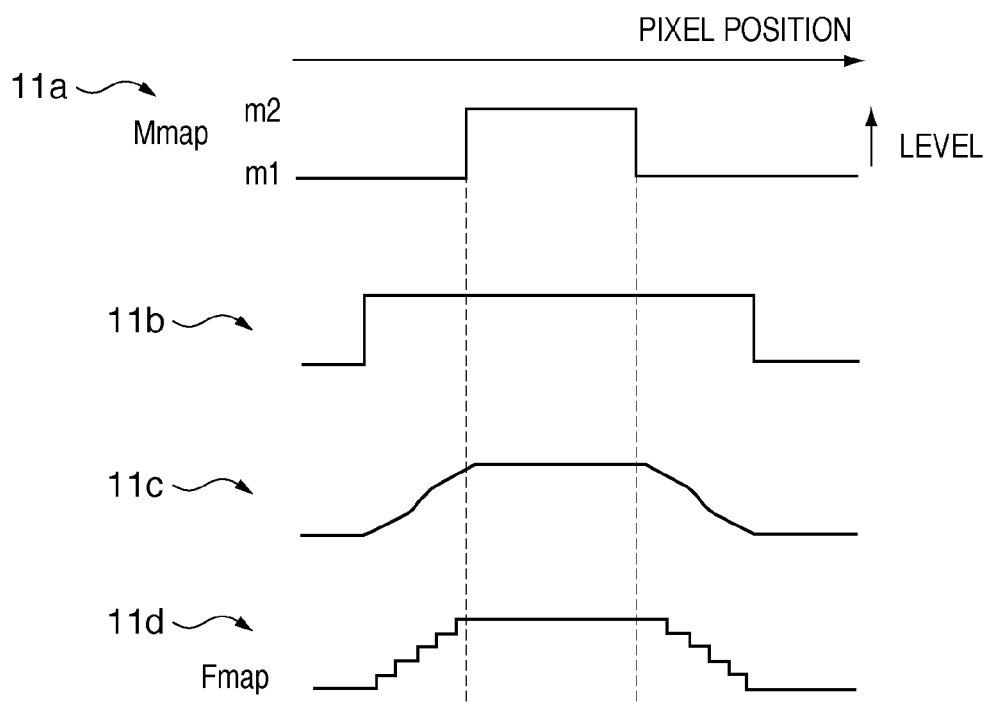
FIG. 11 is a diagram explaining a process of generating a filter factor map.

Then, the filter-factor generation unit 704 performs smoothing filtering on the result of the comparison increase filtering as illustrated by 11c in FIG. 11 so as to normalize the result to low-pass filter factors for use in the low-pass filter processing unit 705 (S1003). The normalized filter factors are then output as a filter factor map Fmap to the low-pass filter processing unit 705 (S1004).

The output filter factor map Fmap gives values, as illustrated by 11d in FIG. 11, that are obtained by removing high-frequency component signals by low-pass filtering and then normalizing spatially smoothed values. If a still region is adjacent to a motion region, the value for a distribution correction factor R is increased continuously within a predetermined range of the still region up to a position where the still region is adjacent to the motion region as illustrated by 11c in FIG. 11.

In this way, the filter-factor generation unit 704 according to the present embodiment changes the filter factor map Fmap for each region in the input frame. At the time of this change, the motion degree map Mmap is smoothed by smoothing filtering so as to spatially smoothly change the distribution correction factor R.

Figure 12:
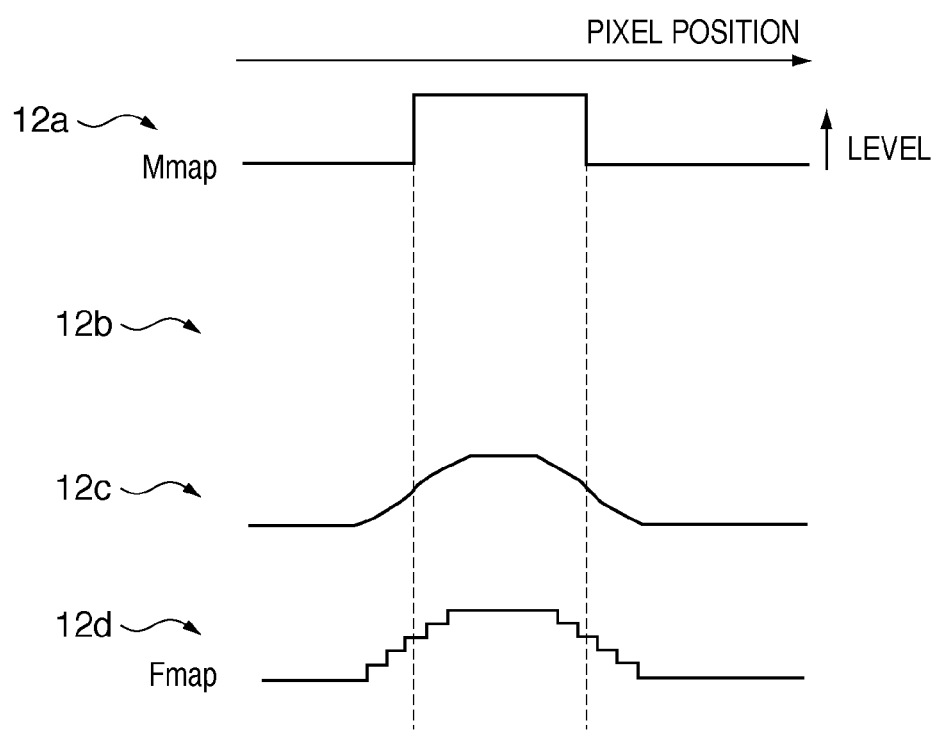
FIG. 12 is a diagram illustrating an example where the filter factor changes in an end portion of a motion region in a subframe.
Figure 13A:
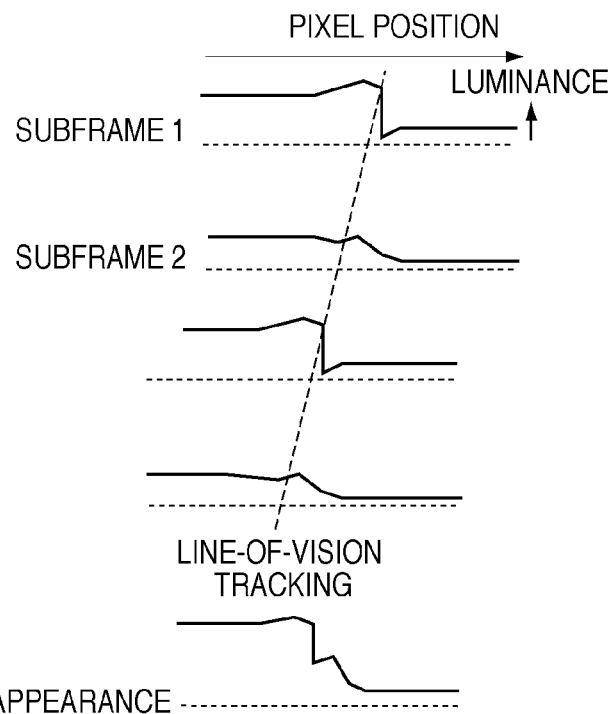
FIGS. 13A and 13B are diagrams illustrating an example where image breakups occur at boundaries between a still region and a motion region.
Figure 13B:
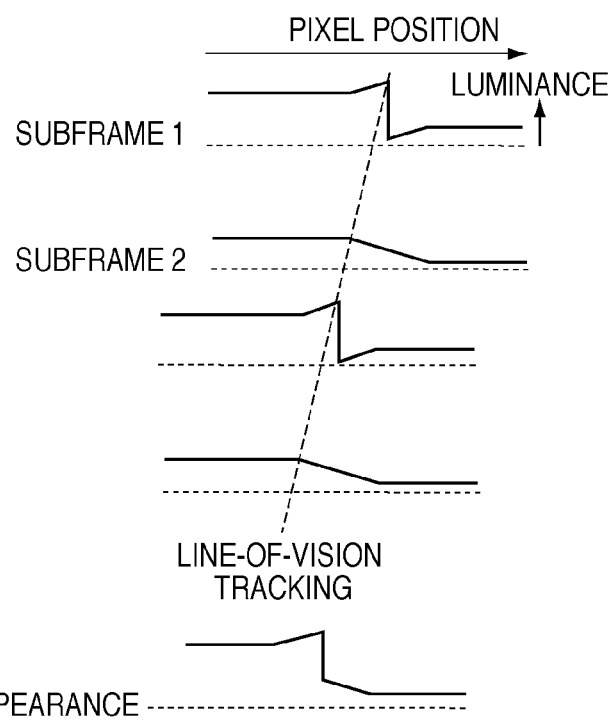

Note that the reason for performing the comparison increase filtering before the smoothing filtering is that if the filter factor map Fmap is generated without performing the comparison increase filtering, then the filter factor will change in an end portion of a motion region in a subframe as illustrated in FIG. 12. In addition, image breakups will occur at the boundary between a still region and a motion region as illustrated in FIG. 13A. It is thus desirable, as illustrated in FIG. 13B, that the smoothing of the filter factor R be performed only within a still region, without being performed in a motion region.

Through the above processing, the filter factor that corresponds to a low-pass filter weight appropriate for each region is output as an Fmap to the low-pass filter processing unit 705.

Figure 1A:
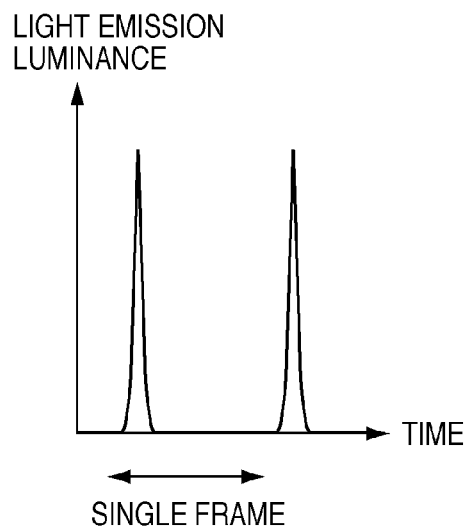
FIG. 1A is a diagram illustrating display characteristics of an impulse-type display device.
Figure 1B:
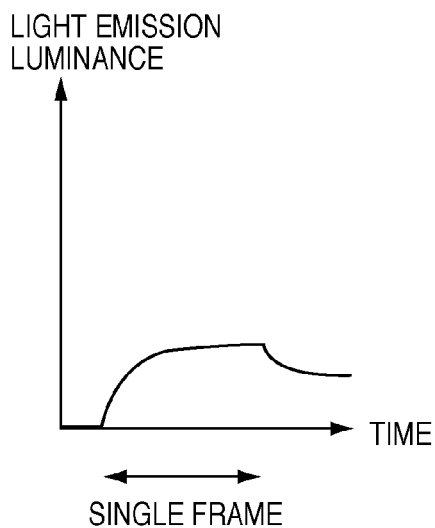
FIG. 1B is a diagram illustrating display characteristics of a hold-type display device.
Figure 2A:
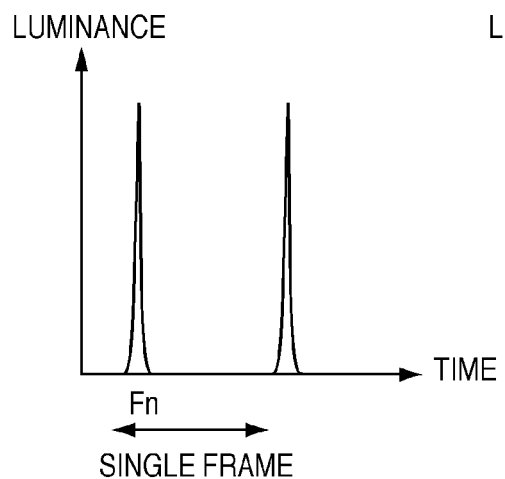
FIG. 2A is a diagram illustrating an input frame for impulse types.
Figure 2B:
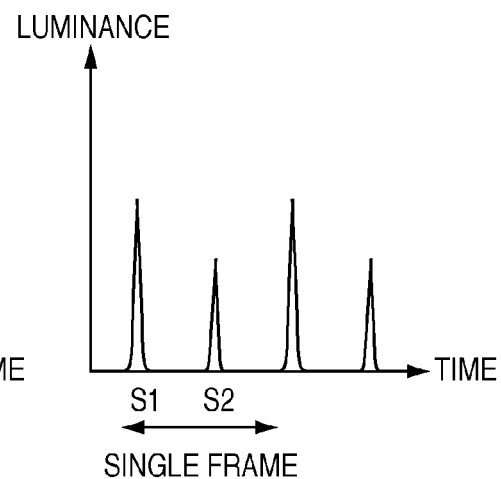
FIG. 2B is a diagram illustrating a case where an input frame is divided into two subframes.
Figure 4A:
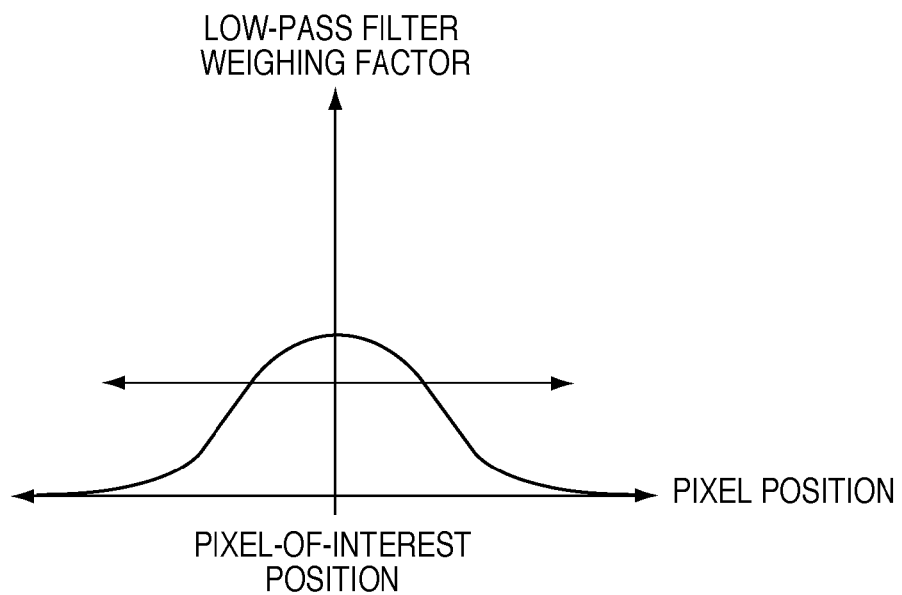
FIGS. 4A and 4B are diagrams illustrating the relationship between the filter factor of a low-pass filter and the output thereof.
Figure 4B:
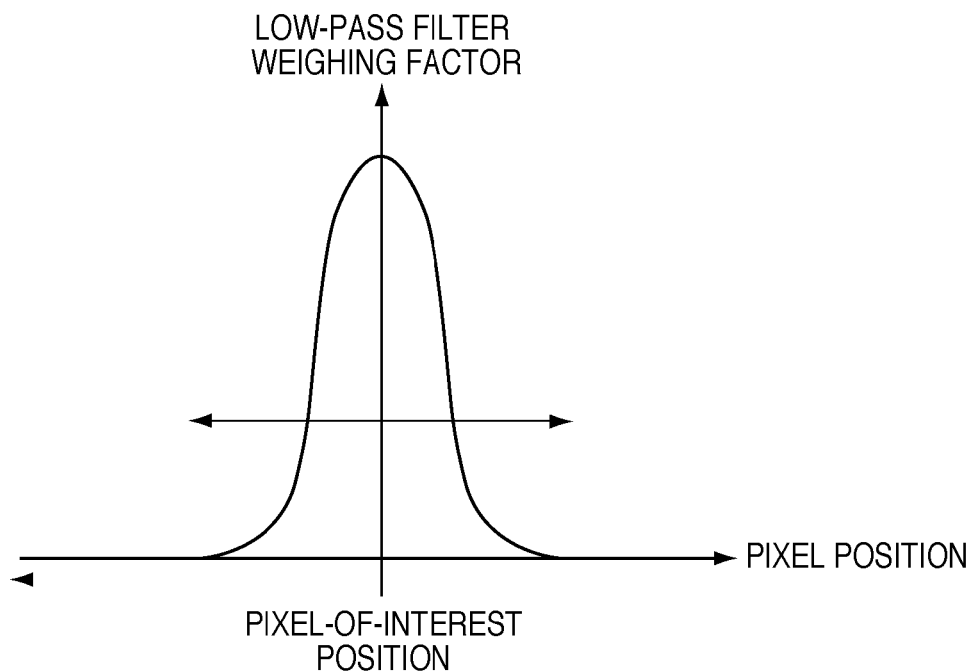

Then, the low-pass filter processing unit 705 performs low-pass filtering on the input frame s701 based on the filter factor map Fmap received from the filter-factor generation unit 704. In the present example, the filtering of each region is performed by changing the low-pass filter weight as appropriate corresponding to the filter factor map Fmap as illustrated in FIGS. 4A and 4B.

Then, the division processing unit 706 converts the output frame value obtained from the low-pass filter processing unit 705 and outputs the subframe s704 as a first subframe.

Then, the differential processing unit 707 generates and outputs the subframe s705 as a second subframe, based on the frame s701 stored in the frame memory 702. For example, a difference between the frame s701 and the subframe s705 is output as a processing result. In this case, the sum of the output subframes agrees with the frame s701.

In the case of an impulse-type display device, the same luminance can be maintained before and after the frame rate conversion because apparent luminance seems comparable if the sum of signals displayed within any arbitrary time remains the same.

The switching unit 708 alternately switches and outputs the subframe s704 and the subframe s705 as an output frame s706.

Figure 6A:
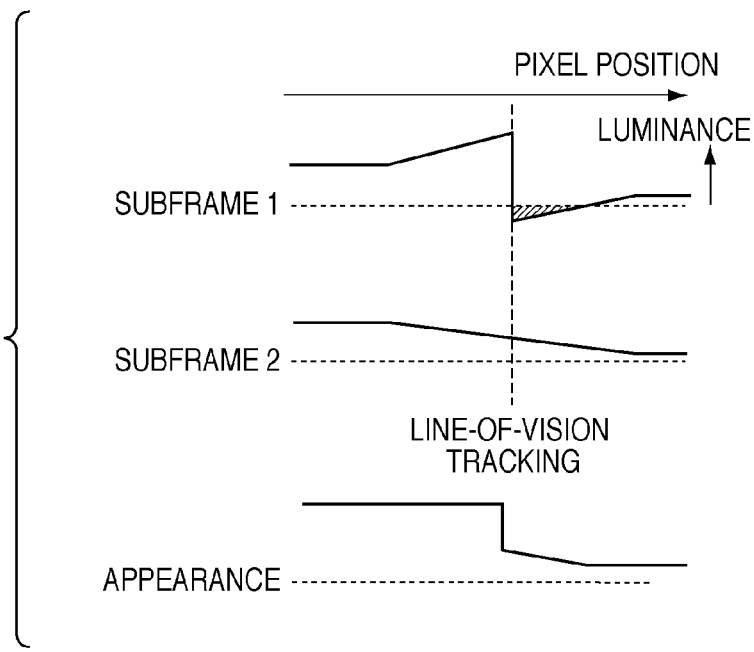
FIGS. 6A and 6B are diagrams illustrating the relationship between outlines of display outputs in the case of applying the technique of Japanese Patent Laid-Open No. 2002-351382 and the appearance of the display outputs as captured visually.
Figure 14A:
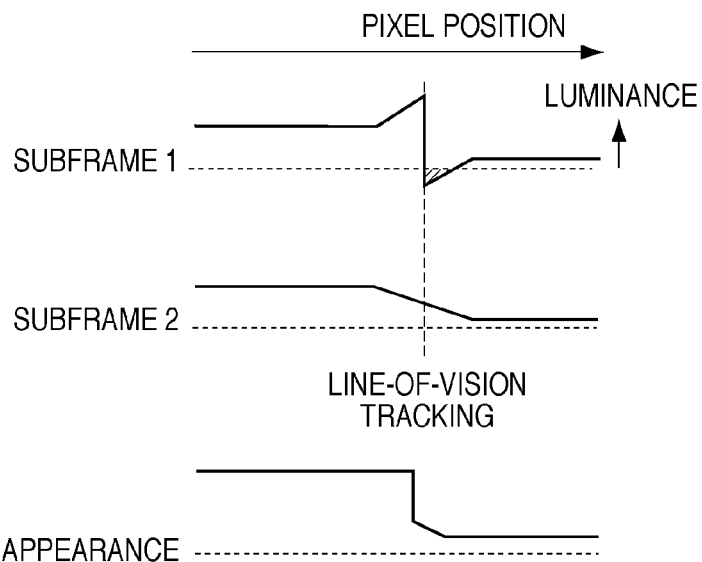
FIGS. 14A and 14B are diagrams illustrating outputs for the case where the filter factor F varies according to the first embodiment.
Figure 14B:
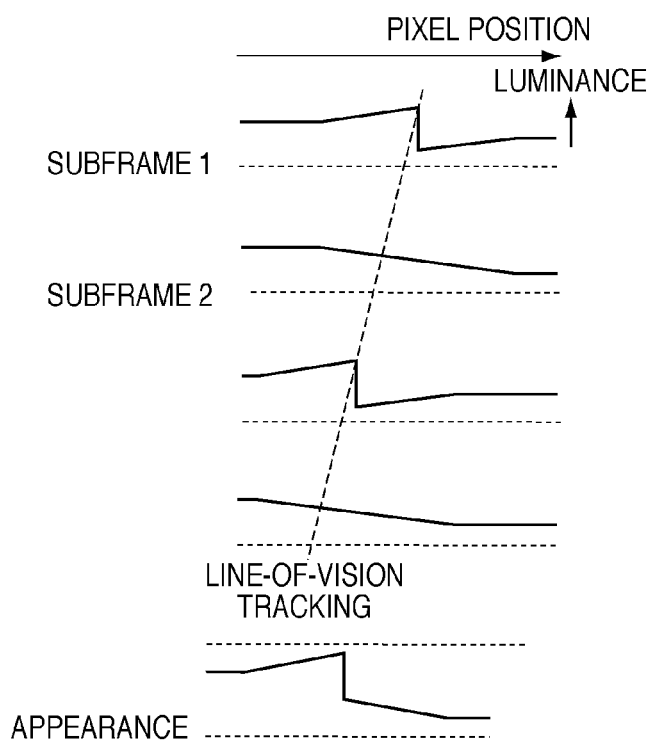

FIGS. 14A and 14B are diagrams illustrating outputs in the case where the filter factor F varies according to the present embodiment. For example, the filter factor F for a small-motion region is set to low as described above. Accordingly, the spatial frequency for that region is high in the subframe s704 that is output behind in time during a single frame time. In this case, the luminance for that region in each of the subframes is indicated by the waveforms in FIG. 14A. Since pseudo contours are less likely to be generated in such a small-motion region, there is no need to reduce the spatial frequency. Besides, it can be seen that such high spatial frequency reduces an area where the luminance increases on the low-luminance edge side as compared with the case illustrated in FIG. 6A.

Figure 6B:
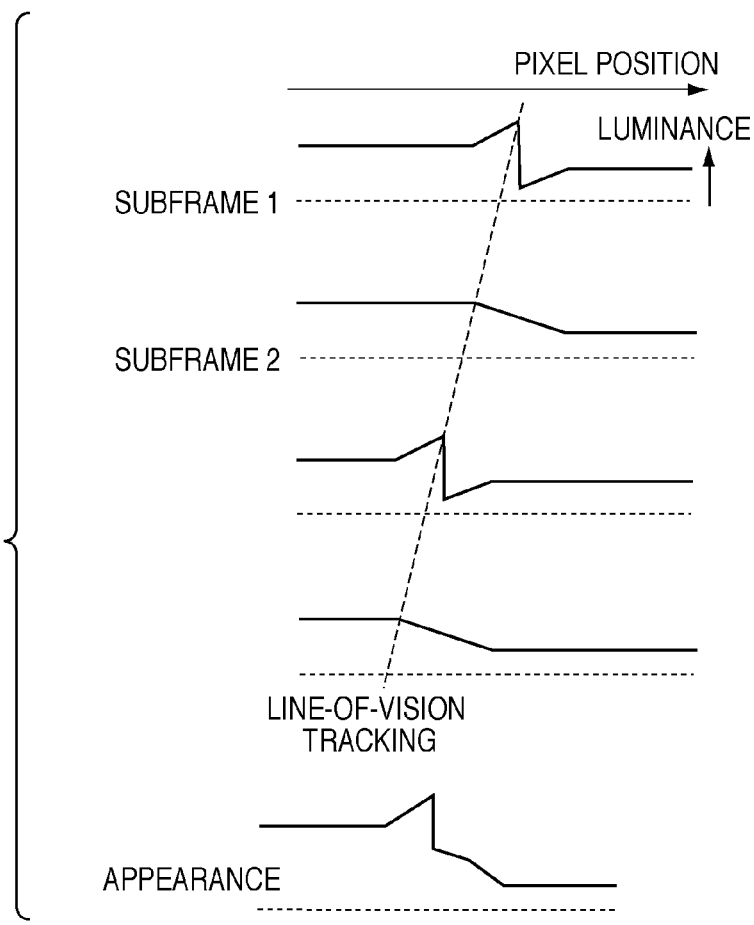

On the other hand, the filter factor F for a large-motion region is set to high as described above. Accordingly, the spatial frequency for that region is low in the subframe s704 that is output behind in time during a single frame time. In this case, the luminance for that region in each of the subframes is indicated by the waveforms in FIG. 14B. It can be seen that such low spatial frequency in the subframe that is behind in time reduces apparent image breakups as compared with the case illustrated in FIG. 6B.

As described, in the case of an impulse-type display device, flicker occurs due to the contrast between the subframes s705 and s704. In the case of a hold type display device, if the contrast is low, the spatial frequency is controlled while maintaining the low contrast.

Accordingly, it is possible to reduce pseudo contours and image breakups such as floating black levels, while maintaining the effect of reducing flicker.

Next, the process performed by the frame rate conversion apparatus illustrated in FIG. 7 will be described with reference to FIG. 15.

Figure 15:
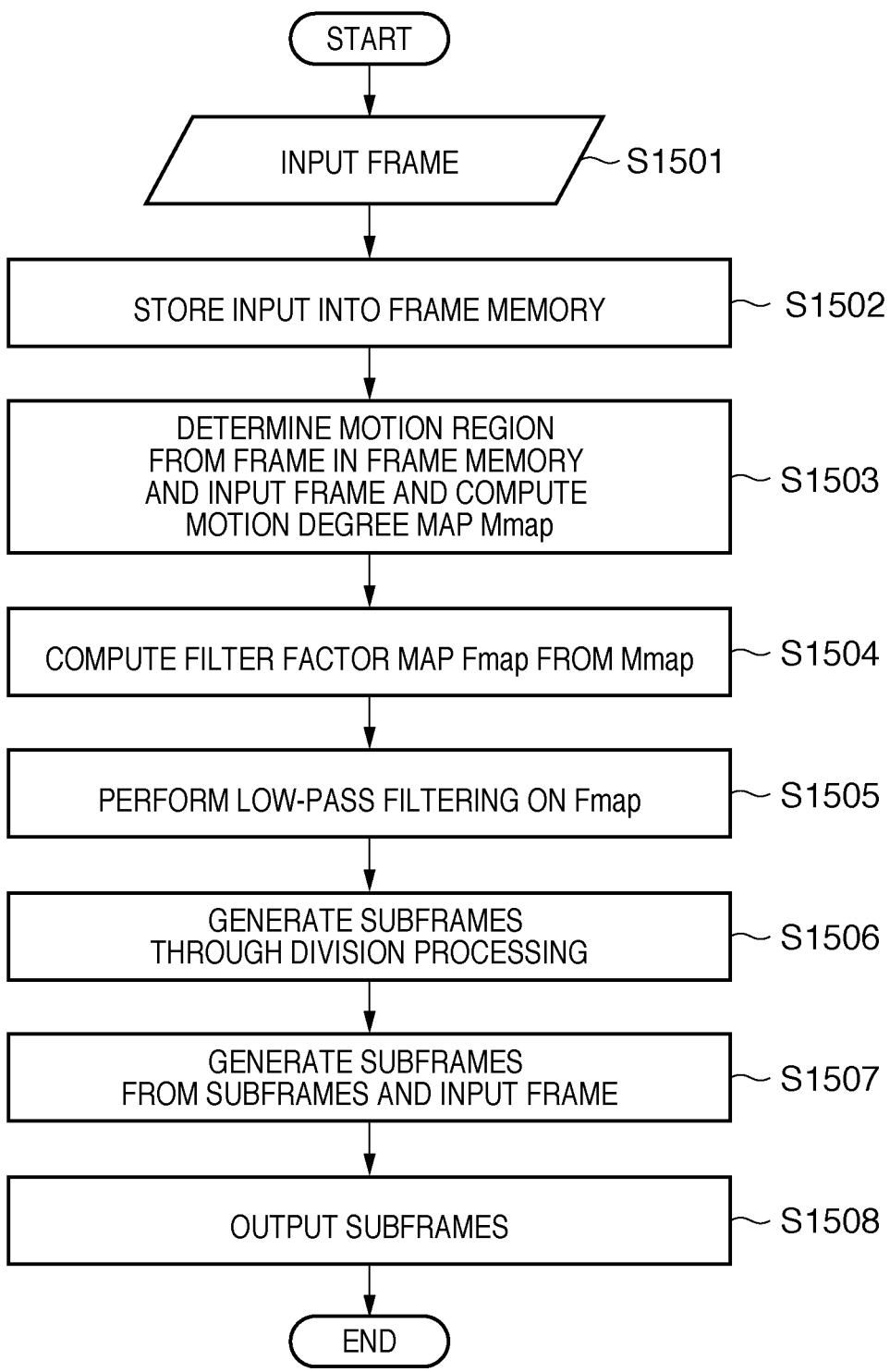
FIG. 15 is a flow chart showing a frame rate conversion process according to the first embodiment.

FIG. 15 is a flow chart showing the frame rate conversion process according to the present embodiment. First, upon receipt of the input frame s700 (S1501), the frame rate conversion apparatus stores that frame into the frame memory 702 (S1502). After having stored the frame, the frame rate conversion apparatus compares the input frame s700 with a frame that has already been stored in the frame memory 702, using the motion-region detection unit 703. The frame rate conversion apparatus then computes the degree of motion M for each region in the frame s701 that has already been stored in the frame memory 702 and outputs the motion degree map Mmap (S1503).

Subsequently, the frame rate conversion apparatus processes the motion degree map Mmap computed in S1503 and computes the result as the filter factor map Fmap, using the filter-factor generation unit 704 (S1504). After the computation of the filter factor map Fmap, the frame rate conversion apparatus processes the frame s701 stored in the frame memory 702, using the low-pass filter processing unit 705 (S1505).

The frame rate conversion apparatus then converts the value processed by the low-pass filter processing unit 705 and generates the subframe s704, using the division processing unit 706 (S1506). After the generation of the subframe s704, the frame rate conversion apparatus generates the subframe s705 from a difference between the subframe s704 and the frame s701 that has already been stored in the frame memory 702, using the differential processing unit 707. Thereafter, the frame rate conversion apparatus alternately switches and outputs the subframe s704 and the subframe s705, using the switching unit 708. After this, the above-described process is repeated upon every input of an input frame.

As described above, according to the present embodiment, the degree of motion is detected for each region in an image of the input frame s700, and the spatial frequency for each region in subframes (s704 and s705) is determined depending on the result of detection. This allows a reduction in pseudo contours and image breakups while maintaining the effect of reducing flicker.

Second Embodiment

Next, a second embodiment will be described. In the first embodiment, the filter factor for the low-pass filter is varied in multiple levels for each region in an input frame. In the second embodiment, the filter factor is switched between several levels, e.g., two levels, and an image is smoothly composed by linearly combining those results at boundaries between regions in the input frame.

Figure 19:
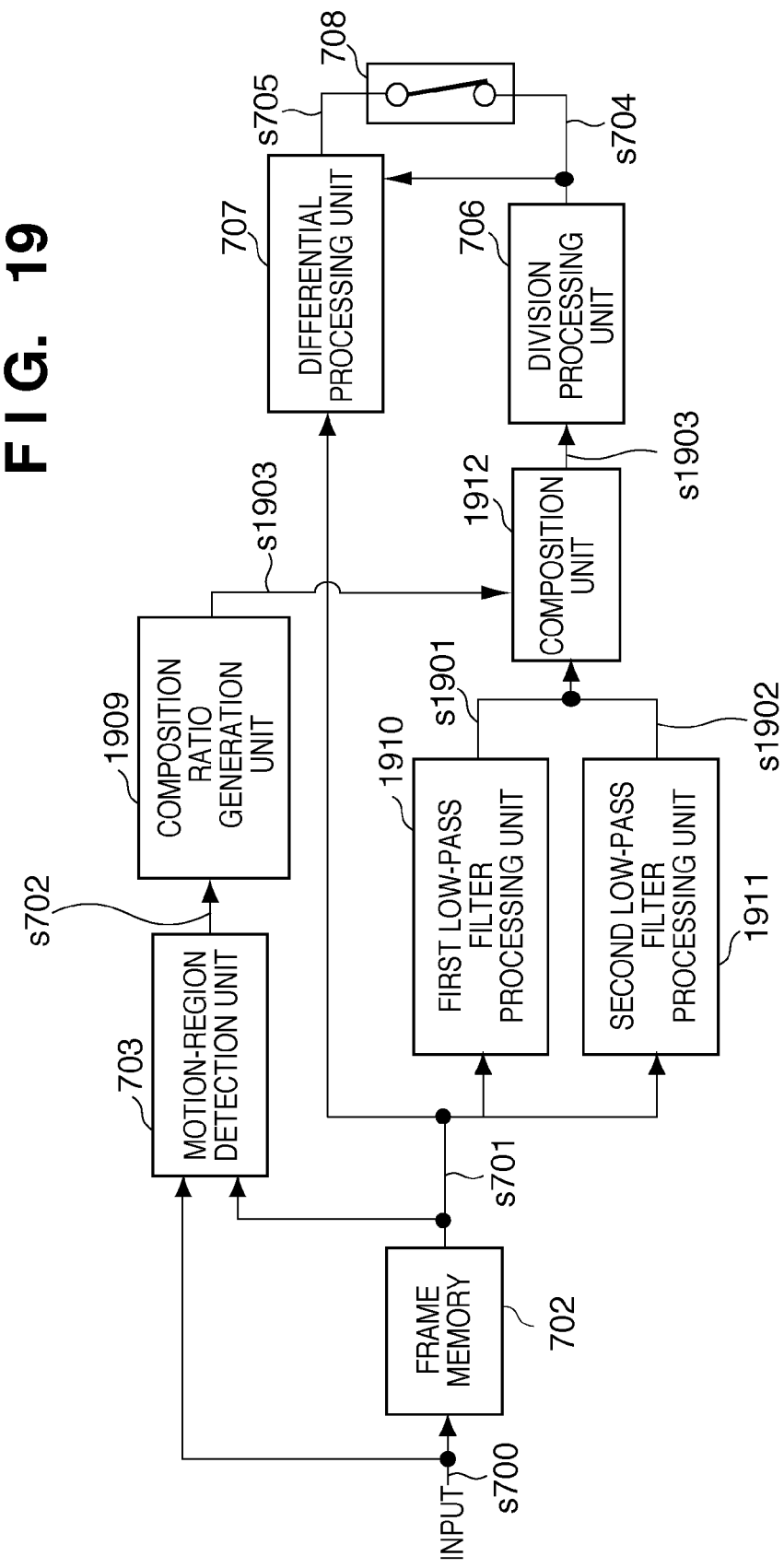
FIG. 19 is a schematic block diagram illustrating an example of the configuration of a frame rate conversion apparatus according to a second embodiment.

FIG. 19 is a schematic block diagram illustrating the configuration of a frame rate conversion apparatus according to the second embodiment. As in the first embodiment, a motion-region detection unit 703 computes an interframe difference for each pixel in input multiple frames and sets a higher output value as the degree of motion M increases. In the case where the filter factor has two levels, the relationship between the input and the output may be as illustrated in FIG. 9. In the case of the present embodiment, m1 and m2 are set to a value of 0 to 1.

A composition ratio generation unit 1909 performs the process illustrated in the flow chart of FIG. 10 on the motion degree map Mmap that has input values of 0 to 1. As a result, a motion region is spatially widened, and a smoothed composition ratio factor map Rmap is computed. The map Rmap is different from the map Fmap described in the first embodiment because the input value of Rmap is in the range of 0 to 1.

Figure 5A:
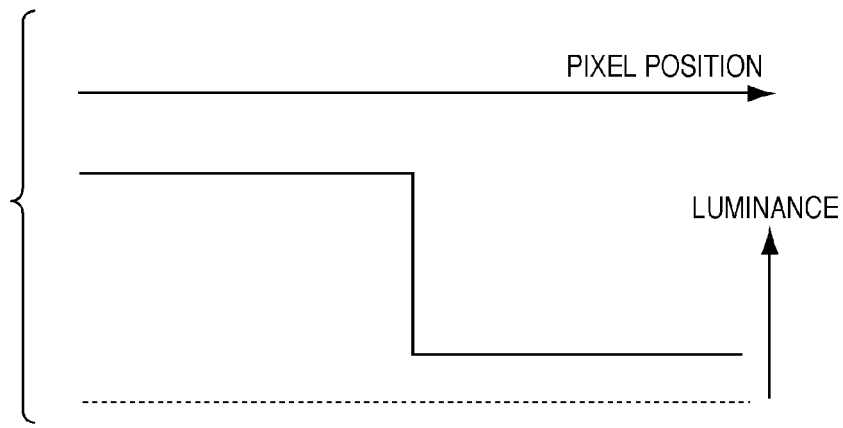
FIGS. 5A to 5C are diagrams illustrating outputs with respect to an input, for the case where the filter factor of a low-pass filter is high and the case where the filter factor is low.
Figure 5B:
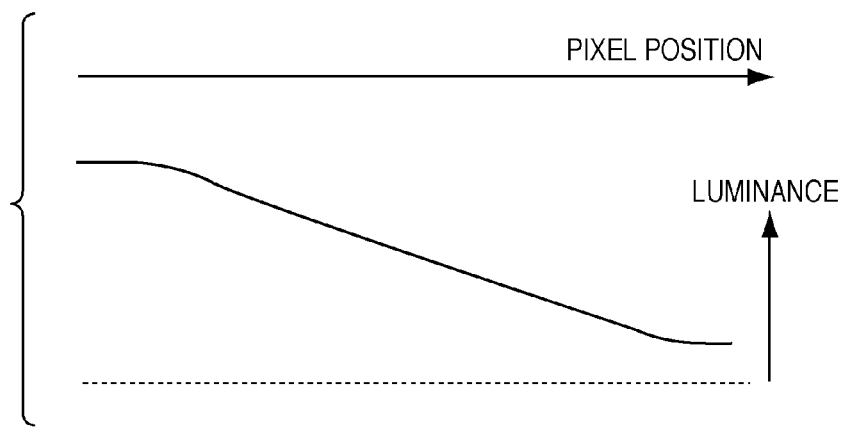
Figure 5C:
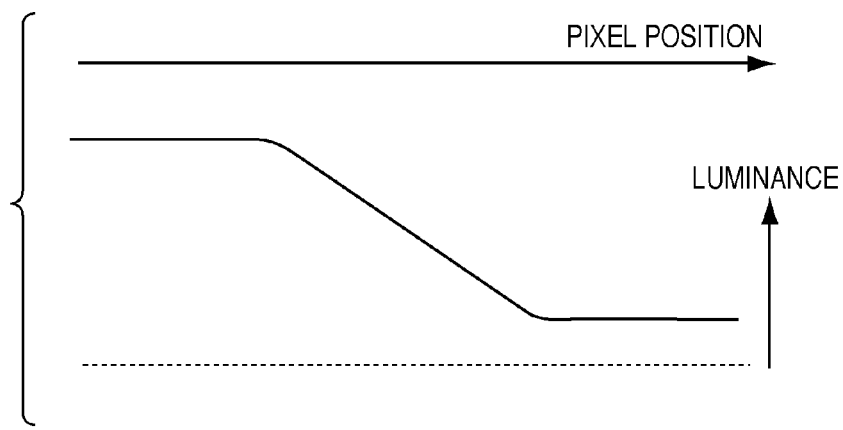

Next, a first low-pass filter processing unit 1910 and a second low-pass filter processing unit 1911 will be described. Both processing units are configured such that one unit has a higher filter factor than the other. In that case, the filter factor for the first low-pass filter processing unit 1910, which is represented in two dimensions, is as illustrated in FIG. 4A, and the filter factor for the second low-pass filter processing unit 1911 is as illustrated in FIG. 4B. Their output results are as illustrated in FIGS. 5B and 5C, respectively.

According to the composition ratio factor map Rmap, a composition unit 1912 performs computation of the outputs from the first and second low-pass filter processing units 1910 and 1911, using the following Equation 1, where Dout is the output of the composition unit, $D_{L1}$ is the output of the first low-pass filter processing unit, $D_{L2}$ is the output of the second low-pass filter processing unit, and x is the pixel position:

$$Dout = Rmap(x) \times D_{L1}(x) + Rmap(x) \times D_{L2}(x)$$

The operations of a division processing unit 706, a differential processing unit 707, and a switching unit 708 are the same as described in the first embodiment.

The composition ratio generation unit 1909 and the composition unit 1912 allow the generation of subframes that have varying filter factors according to motion regions, and those subframes produce a spatially smooth low pass image.

Figure 20:
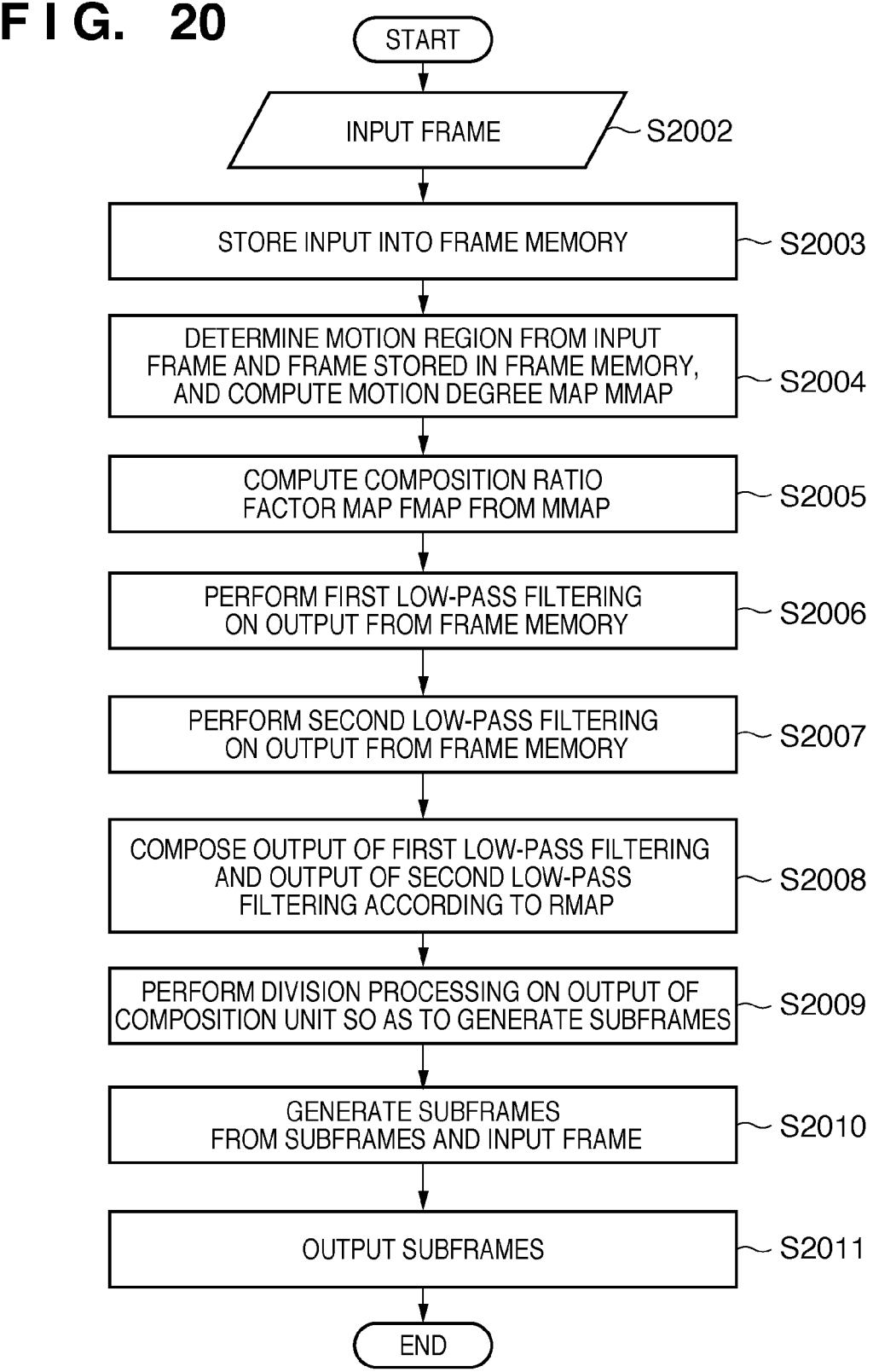
FIG. 20 is a flow chart showing a frame rate conversion process according to the second embodiment.

FIG. 20 is a flow chart showing the frame rate conversion process according to the second embodiment. First, upon input of the input frame s700 (S2002), the frame rate conversion apparatus stores that frame into the frame memory 702 (S2003). After storing the frame, the frame rate conversion apparatus compares the input frame s700 with a frame that has already been stored in the frame memory 702, using the motion-region detection unit 703. The frame rate conversion apparatus then computes the degree of motion M for each region in the frame s701 that has already been stored in the frame memory 702, and outputs the motion degree map Mmap (S2004).

Subsequently, the frame rate conversion apparatus processes the motion degree map Mmap computed in S2004 and computes the processing result as the composition ratio factor map Rmap, using the composition ratio generation unit 1909 (S2005). After the computation of the composition ratio factor map Rmap, the frame rate conversion apparatus processes the frame s701 stored in the frame memory 702, using the first low-pass filter processing unit 1910 (S2006). The frame rate conversion apparatus also processes the frame s701 stored in the frame memory 702, using the second low-pass filter processing unit 1911 (S2007).

Then, the composition unit 1912 composes the resultant values from the first low-pass filter processing unit 1910 and the second low-pass filter processing unit 1911 according to the result S1903 obtained by the composition ratio generation unit 1909 (S2008). Then, the division processing unit 706 computes the processed value obtained by the composition unit 1912 using Equation 1 so as to generate the subframe s704 (S2009). After the generation of the subframe s704, the frame rate conversion apparatus generates the subframe s705 from a difference between the subframe s704 and the frame s701 that has already been stored in the frame memory 702, using the differential processing unit 707. Thereafter, the frame rate conversion apparatus alternately switches and outputs the subframe s704 and the subframe s705, using the switching unit 708 (S2011). After this, the above-described process is repeated upon every input of an input frame.

According to the present embodiment, the degree of motion is detected for each region in an image of the input frame s700, and the spatial frequency for each region in subframes (s704 and s705) is determined according to the result of detection. This allows a reduction in pseudo contours and image breakups while maintaining the effect of reducing flicker.

Above, examples of representative embodiments of the present invention have been described, but the present invention is not limited to the embodiments described above and shown in the drawings, and the present invention can be modified as appropriate without departing from the gist thereof.

Other Embodiments

While the embodiments according to the present invention have been described using examples where an interframe difference is obtained, and the degree of motion M for each region in an image of an input frame is computed according to the relationship between a difference value and a threshold value, the present invention is not limited thereto. For example, an interframe vector for each region may be computed, and the degree of motion M may be computed from the magnitude of that vector.

Here, the process of computing an interframe vector for each region and computing the degree of motion M from the magnitude of that vector, performed by the motion-region detection unit 703, will be described with reference to FIG. 16.

Figure 16:
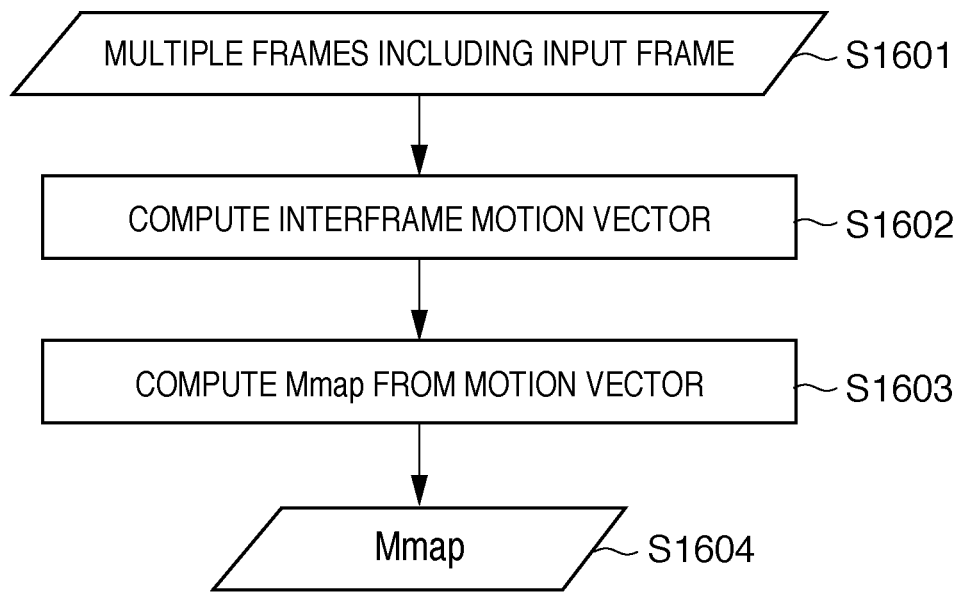
FIG. 16 is a flow chart showing processing performed by the motion-region detection unit according to a variation.

FIG. 16 is a flow chart showing the processing performed by the motion-region detection unit 703 according to a variation. First, the motion-region detection unit 703 inputs multiple frames including an input frame (S1601). Then, an interframe motion vector is computed from the input frame and a frame that has been input before (e.g., immediately before) the input frame (S1602). Then, the degree of motion M is computed from the motion vector (S1603), and the degree of motion M is output (S1604).

Note that the computation of the degree of motion M may be performed in the same manner as described with reference to FIG. 9, based on the magnitude of the motion vector. The use of the motion vector increases the precision of recognition of the degree of motion of each region in the input frame.

Figure 17:
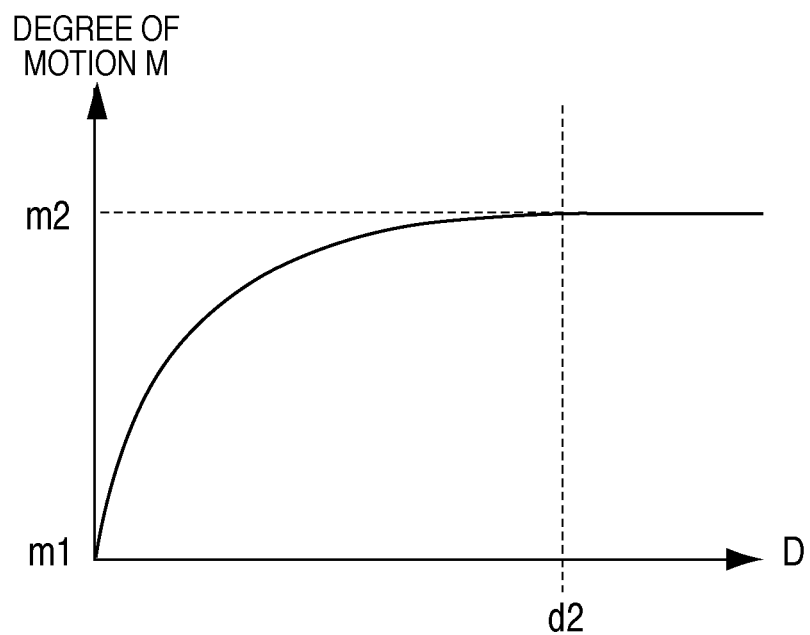
FIG. 17 is a diagram illustrating an example of the case where the degree of motion M is other than binary.

Moreover, while the embodiments according to the present invention have been described using the example where the degree of motion M is binary (m1, m2), the present invention is not limited thereto. For example, as illustrated in FIG. 17, m2 may be output as the degree of motion M if the interframe difference D is not lower than a threshold value d2, whereas a value of m1 to m2 may be output as the degree of motion M if the interframe difference D is lower than the threshold value d2. Here, if the interframe difference D is in the range of 0 to d2, the output value for the degree of motion M changes (increases) monotonously as the difference value increases. This reflects continuity in the magnitude of motion. This method may of course be adopted in the case of obtaining the degree of motion M from the abovementioned motion vector.

Alternatively, in the case where the motion region detection unit 703 computes the degree of motion M from a difference value between input multiple frames, the degree of motion M may be computed from a difference value between low-spatial-frequency images that are obtained by performing low-pass filtering on the multiple frames.

Figure 18:
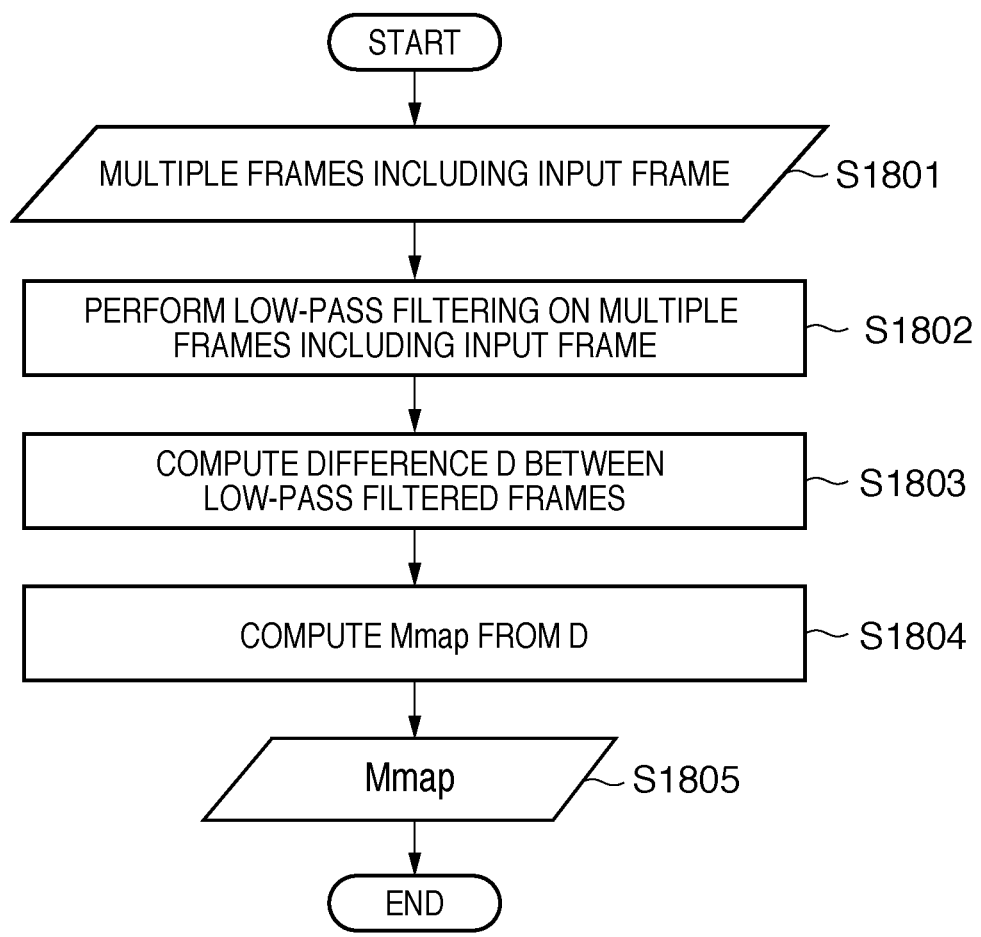
FIG. 18 is a flow chart showing processing performed by the motion-region detection unit on multiple frames.

FIG. 18 is a flow chart showing the process performed by the motion-region detection unit on multiple frames. First, multiple frames including an input frame are input (S1801), and low-pass filtering is performed on the multiple frames (S1802). Then, a difference value between low-spatial-frequency images is computed (S1803), the degree of motion M is computed from the difference value (S1804), and the degree of motion M is output (S1805).

This reflects the degree of tailing at the time of displaying subframes that have gone through frame rate conversion performed in a spatial frequency separation system.

Figure 21:
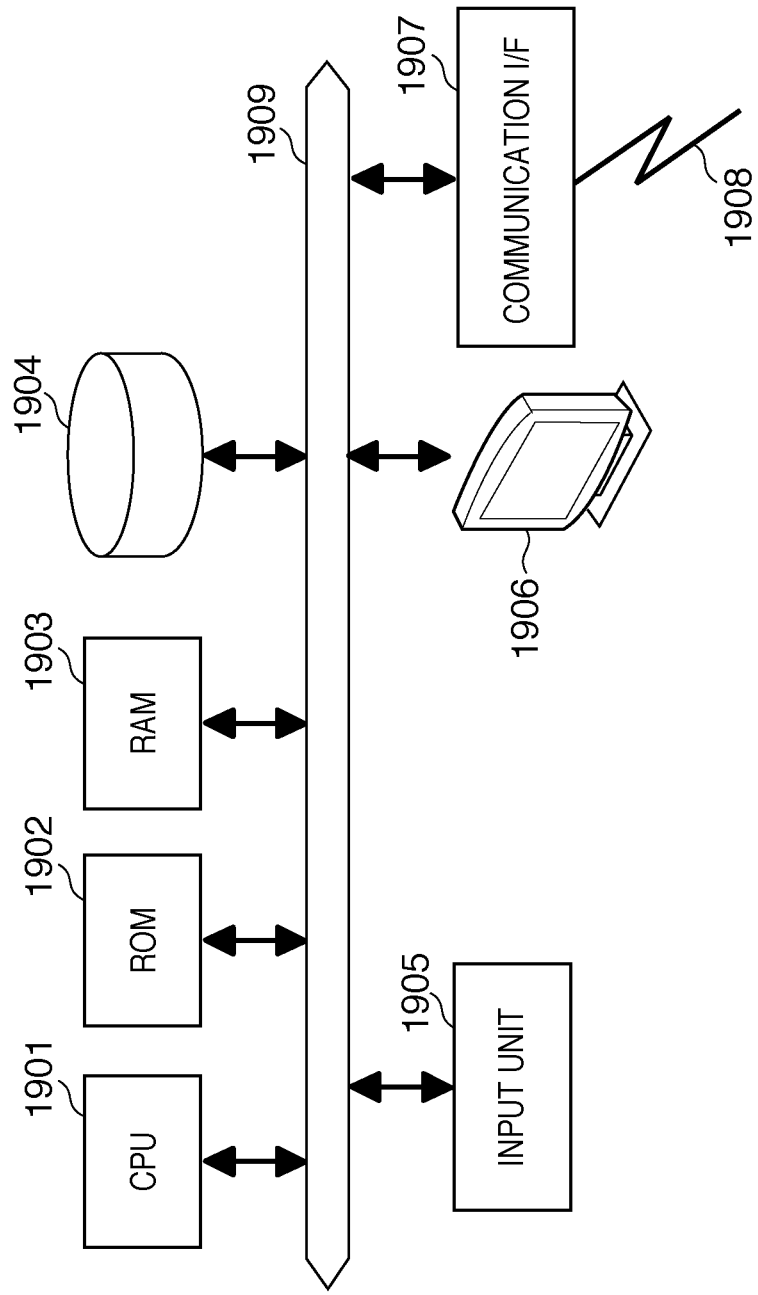
FIG. 21 is a diagram illustrating a hardware configuration of a frame rate conversion apparatus according to an embodiment of the present invention.

FIG. 21 is a diagram illustrating a hardware configuration of a frame rate conversion apparatus according to an embodiment of the present invention. In the present example, a CPU 1901, a ROM 1902, a RAM 1903, a hard disk 1904, an input unit 1905, an output unit 1906, and a communication I/F 1907 are connected to a bus 1909. The CPU 1901 performs the above-described process according to a program stored in the ROM 1902. The RAM 1903 is a memory that includes a work area used by the CPU 1901 performing processing and various tables. The input unit 1905 is a device such as a camera that inputs an image. The output unit 1906 is a device such as a display device that outputs an image. The communication I/F 1907 controls data communications with a network 1908.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-095163, filed Apr. 9, 2009, which is hereby incorporated by reference herein in its entirety.

What is claimed is:

1. A frame rate conversion apparatus that divides an input frame into a plurality of subframes and performs frame rate conversion, comprising:
   a detection unit that detects a degree of motion of the input frame;
   a generation unit that generates a filter factor for use in filtering, according to the degree of motion detected by said detection unit;
   a filtering unit that filters the input frame based on the filter factor generated by said generation unit; and
   an output unit that divides the frame obtained as a result of the filtering by said filtering unit into a plurality of subframes and outputs the subframes,
   wherein said output unit includes:
      a division processing unit that divides the frame obtained as a result of the filtering by said filtering unit into first subframes;
      a differential processing unit that generates second subframes from a difference between the first subframes and the input frame; and
      a switching unit that switches between outputting the first subframes and outputting the second subframes during a single frame time.

2. The frame rate conversion apparatus according to claim 1, wherein said detection unit detects the degree of motion of the input frame based on an interframe difference value that is calculated from the input frame and a frame that has been input before the input frame.

3. The frame rate conversion apparatus according to claim 1, wherein said generation unit generates a filter factor for use in controlling spatial frequencies of the divided subframes, according to the degree of motion of the input frame.

4. The frame rate conversion apparatus according to claim 1, wherein said filtering unit is a low-pass filter that removes a high-frequency component from the input frame.

5. A frame rate conversion apparatus that divides an input frame into a plurality of subframes and performs frame rate conversion, comprising:
   a detection unit that detects a degree of motion of the input frame;
   a filtering unit that respectively filters the input frame based on predetermined different filter factors;
   a computation unit that computes a composition ratio for a plurality of frames that have been respectively filtered by said filtering unit using the different filter factors, according to the degree of motion detected by said detection unit;
   a composition unit that composes the plurality of frames that have been respectively filtered by said filtering unit, based on the composition ratio computed by said computation unit; and
   an output unit that divides the frame obtained as a result of the composition by said composition unit into a plurality of subframes and outputs the subframes,
   wherein said output unit includes:
      a division processing unit that divides the frame obtained as a result of the composition by said composition unit into first subframes;
      a differential processing unit that generates second subframes from a difference between the first subframes and the input frame; and
      a switching unit that switches between outputting the first subframes and outputting the second subframes during a single frame time.

6. A frame rate conversion method performed by a frame rate conversion apparatus that divides an input frame into a plurality of subframes and performs frame rate conversion, the method comprising:
   detecting a degree of motion of the input frame;
   generating a filter factor according to the degree of motion detected in said detecting step;
   filtering the input frame based on the filter factor generated in said generating step;
   dividing the frame obtained as a result of the filtering in said filtering step into a plurality of subframes; and
   outputting the subframes,
   wherein said outputting step includes:
      dividing the frame obtained as a result of the filtering in said filtering step into first subframes;
      generating second subframes from a difference between the first subframes and the input frame; and
      switching between outputting the first subframes and outputting the second subframes during a single frame time.

7. A frame rate conversion method performed by a frame rate conversion apparatus that divides an input frame into a plurality of subframes and performs frame rate conversion, the method comprising:
   detecting a degree of motion of the input frame;
   respectively filtering the input frame based on predetermined different filter factors;
   computing a composition ratio for a plurality of frames that have been respectively filtered in said filtering step, according to the degree of motion detected in said detecting step;
   composing the plurality of frames that have been respectively filtered in said filtering step, based on the composition ratio computed in said computing step;
   dividing the frame obtained as a result of the composition in said composing step into a plurality of subframes; and
   outputting the subframes,
   wherein said outputting step includes:
      dividing the frame obtained as a result of the composition in said composing step into first subframes;
      generating second subframes from a difference between the first subframes and the input frame; and
      switching between outputting the first subframes and outputting the second subframes during a single frame time.

8. A non-transitory computer-readable storage medium storing an executable program for causing a computer to perform the method according to claim 6.

9. A non-transitory computer-readable storage medium storing an executable program for causing a computer to perform the method according to claim 7.

* * * * *